Patented Aug. 5, 1924.

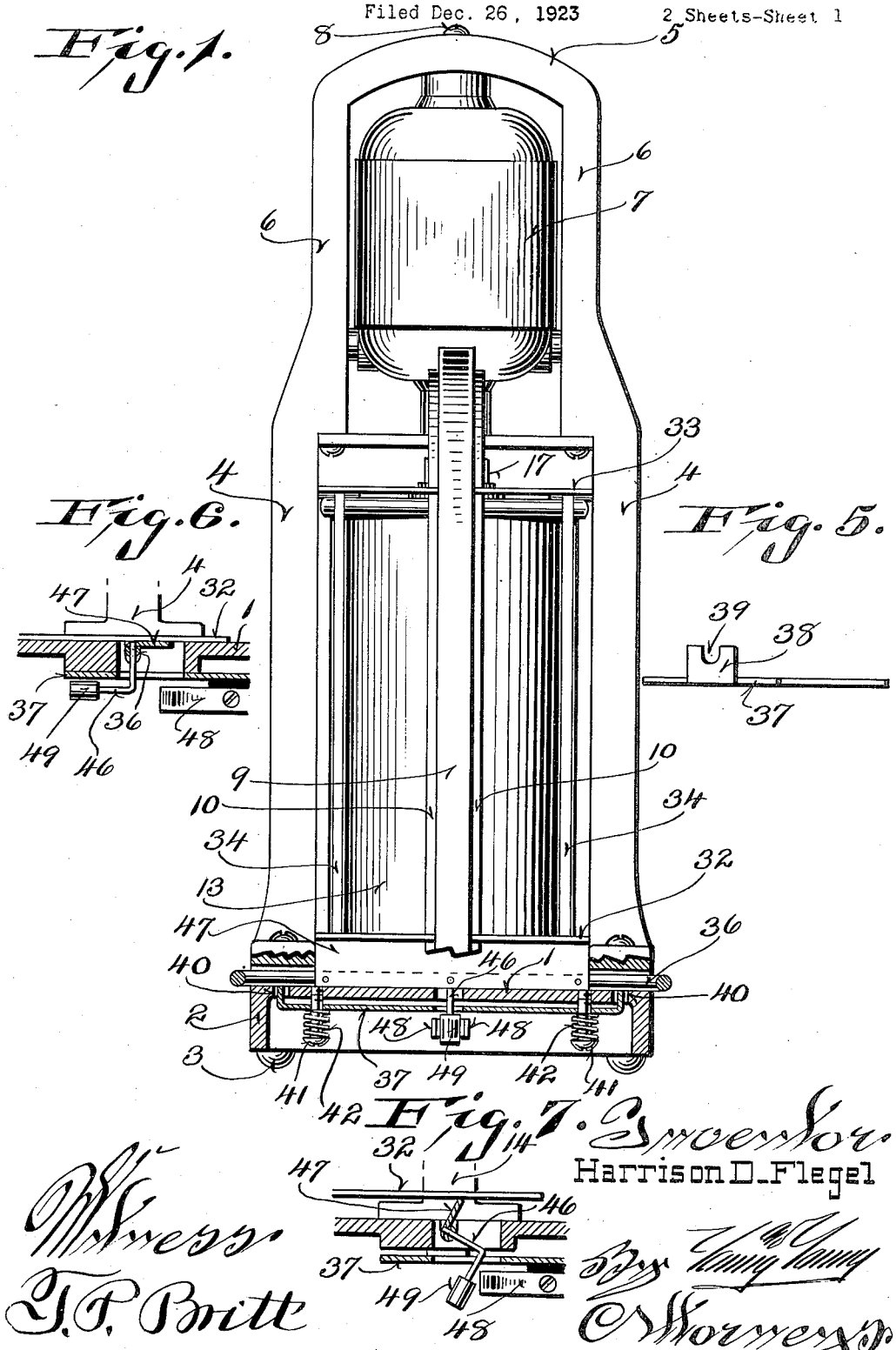

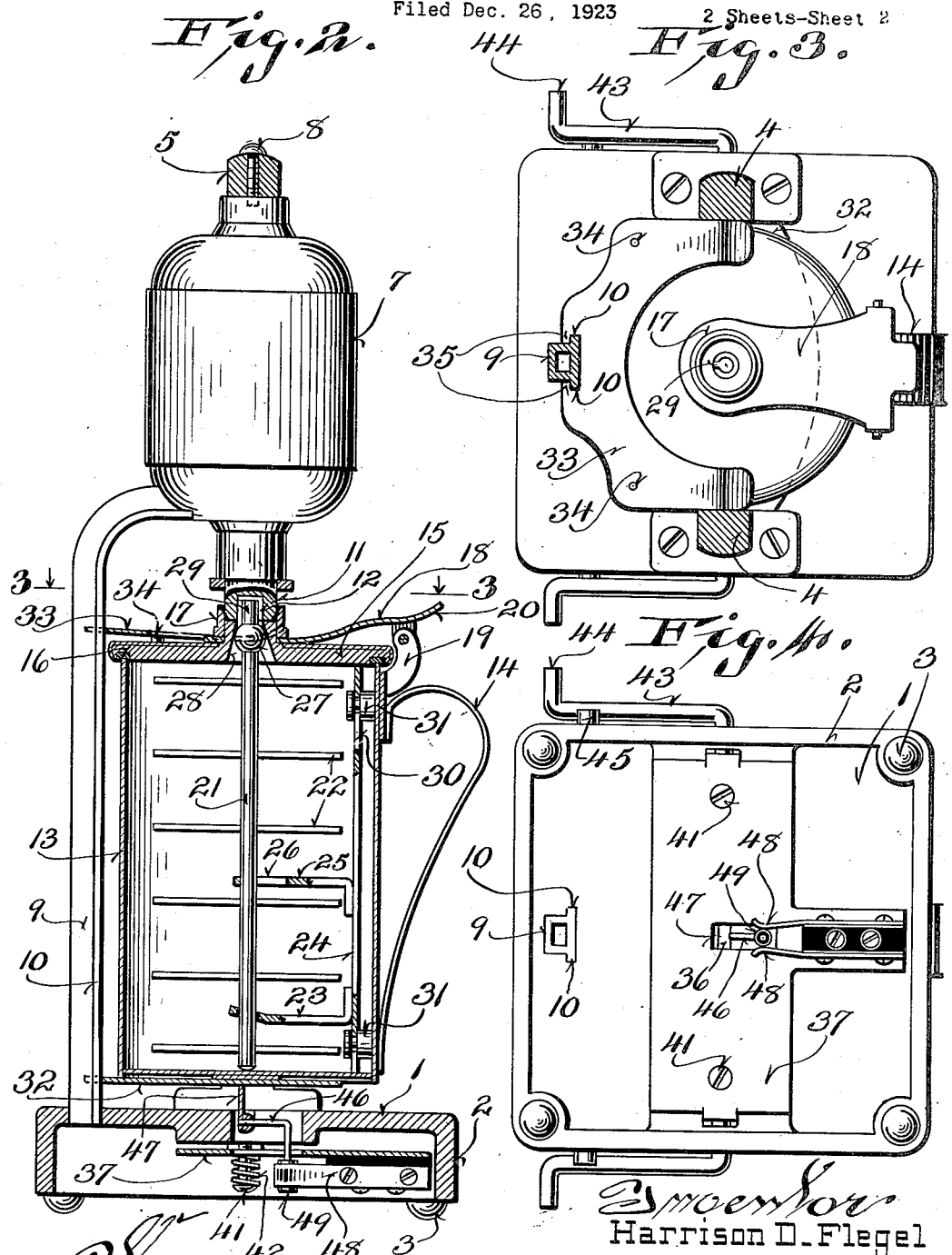

1,503,943

UNITED STATES PATENT OFFICE.

HARRISON D. FLEGEL, OF RACINE, WISCONSIN.

MIXER.

Application filed December 26, 1923. Serial No. 682,752.

*To all whom it may concern:*

Be it known that I, HARRISON D. FLEGEL, a citizen of the United States, and resident of Racine, in the county of Racine and State of Wisconsin, have invented certain new and useful Improvements in Mixers; and I do hereby declare that the following is a full, clear, and exact description thereof.

This invention relates to mixers and is particularly directed to a drink mixing device.

Objects of this invention are to provide a mixing device in which no splashing can occur, in which an electrical motor provided for driving the device is automatically stopped before the container for the liquid can be removed, in which a spring pressure is exerted upon a cover for the container until the motor has stopped, in which the cover is tightly pressed in a closed position before the motor can be started, and in which means are provided associated with a motor starting mechanism which automatically puts a spring pressure upon the cover prior to the starting of the motor.

Further objects are to provide a mixing device in which a container is employed having a beater normally mounted therein, in which the beater may be readily moved to one side to facilitate dispensing or preparing the drink, in which the entire mixing elements may be bodily removed from the container for cleansing purposes, for instance, and in which the closing of the cover automatically centers the beater thereby avoiding any possibility of misalignment of the parts.

Further objects are to provide a mixing device which has a strong and substantial mechanical construction not likely to get out of order, in which the parts may be readily manufactured and assembled, and to provide a device which may be easily operated.

An embodiment of the invention is shown in the accompanying drawings, in which:—

Figure 1 is a rear view of the device with parts in section.

Figure 2 is a side elevation of the apparatus with the major portion of the device in section.

Figure 3 is a view corresponding approximately to a section on the line 3—3 of Figure 2.

Figure 4 is a view from the bottom side of the device.

Figure 5 is a view of the spring pressed plate.

Figure 6 is a fragmentary view showing the relation of the supporting plate and the electrical switch.

Figure 7 is a view corresponding to Figure 6 showing the parts in a different position of adjustment.

The device comprises a hollow base portion 1 provided with downturned portions 2 and with a plurality of feet 3 if desired. A pair of uprights 4 are secured to the base and project upwardly and are joined by the arch-shaped portion 5 at their upper ends. They are provided adjacent their upper ends with portions 6 which are spaced apart a distance sufficient to conveniently receive between them the electric motor 7. A screw 8 may project downwardly through the upper portion 5 of the supports into the motor. A third upright is provided and consists of a member 9 having lateral flanges 10. This member projects through an aperture in the base and is hollow throughout its extent. At its upper end it curves inwardly to the motor. This member is utilized to provide a conduit for the wires from the motor thus fully protecting the wires from damage between the motor and the switch mechanism hereinafter described. The motor is provided with a downwardly extending shaft 11 which is hollowed out and provided with one or more radial lugs 12.

The container 13 may be provided with a handle 14, if desired, and is provided with a cover 15 equipped with annular gaskets 16 adapted to contact with the upper edges of the container, as illustrated in Figure 2. This cover is provided with an upstanding central portion surrounded by a ring or ferrule 17 which, in the position shown in Figure 2, is adapted to loosely receive the shaft 11 of the motor. The cover is rigidly secured to an arm 18 pivotally mounted upon a bracket 19 extending upwardly from the container 13 and is provided with a manipulating thumb piece or extension 20 whereby the cover may be readily rocked into open position.

The beater comprises a central shaft 21 from which a plurality or radial arms 22 extend. These arms may be straight rods, as shown, or of other suitable construction. This spindle is loosely carried by an outwardly projecting arm 23 adjacent the lower end of the container supported from a vertical strap member 24. It is to be noted that the opening in the member 23 is of such extent as to permit rocking motion of the central stem or shaft 21 of the beater. Also this action is facilitated by slightly tilting the outer end of the member 23 as shown in Figure 2. A second projecting arm 25 is provided at a spaced point above the arm 23 and is rigidly carried by the vertical member or strap 24. This arm 25 is provided with an elongated slot 26 which loosely receives the spindle 24 and when the spindle is detached from the motor allows it to rock rearwardly towards the handle portion of the container 13. The upper end of the spindle or shaft 21 of the beater is provided with a spherical ball 27. This ball cooperates with the conical surface 28 of a central aperture through the top 15 and thus aids in correctly centering the spindle 21 of the beater when the top is closed. The spindle is provided with a projecting portion 29 which is equipped with a key adapted to contact with one of the lugs 12 of the recessed motor shaft 11 when the projecting end is positioned within such recessed shaft, as shown in Figure 2.

It will be seen from the description thus far given that when the cover is in position that the spindle of the beater is correctly centered and that when the cover is opened the spindle may be allowed to fall towards the handle portion of the container thus facilitating the placing of material in the container. Also the members 25 and 23 prevent the spindle from falling outwardly when the drink is poured from the container 13.

In order to provide for the easy removal of the beater, the member 24 is provided with bayonet or other type of slots 30 which fit between the headed and shouldered portions of pins 31 carried by the container.

The device is provided with a lower supporting plate 32 and with an upper plate 33 which may be of the general shape illustrated in Figure 2. These plates are held together by means of rods 34 and are so spaced that when the container is slipped between them preparatory to mixing a drink that the arms 32 and 33 will yieldingly force the top 15 downwardly against the upper edges of the container 13. These plates 32 and 33, as may be seen from Figures 2 and 3, are slidably guided by the member 9,— such plates being provided with ears 35 which fit behind the lateral flanges 10 of the member 9, as shown in Figure 3.

A transverse shaft 36 is loosely carried in apertures formed in the base 1, as may be seen from Figure 1, and a pressure plate 37 is mounted within the hollow base and is provided with upwardly extending ears or projections 38 which are socketed, as indicated at 39 in Figure 5, to receive the transverse shaft, such ears 38 passing through apertures 40 formed in the base 1 of the device. This bottom plate 37 is carried by screws 41 and is urged upwardly by means of helical springs 42 guided and carried by such screws. The transverse shaft 36 is provided with outer arms 43 which may, if desired, be provided with projecting manipulating portions 44. The stroke or rocking motion of the arms 43 is limited in one direction, that is to say, downwardly, by means of the pins 45 (see Figure 4) carried by the base portion of the device. The plate 37 and the base portion are provided with aligning slots through which the angularly arranged arm 46 of the movable element of a switch projects. This switch arm is rigidly attached to the transverse shaft 36, as clearly shown in Figures 2, 4, 6 and 7, and the transverse shaft 36 is further provided with a projecting arm 47 for a purpose hereinafter to appear. A convenient way of making the switch is to provide a pair of relatively stationary contact plates 48 normally spaced apart and located in the motor circuit and to provide the switch arm 46 with an insulating sheath around which is positioned a metallic or conducting cylinder 49 so that the portion 49 of the switch is completely insulated from the remaining portions of the device.

The wiring has been omitted from the drawings as it is of simple type and merely connects the motor and switch in series, for the reason that the showing of the wiring it is thought, would needlessly confuse the illustration.

The operation of the apparatus is as follows:—Assuming that the container 13 is filled with the material it is desired to mix, such container is closed by rocking the top 15 downwardly. Thereafter, the closed container is slipped between the arms or plates 32 or 33 which imposes a spring pressure upon the cover and aids in holding the cover down against the container,— the gasket 16 forming a secure joint. Thereafter the arms 43 are rocked upwardly thus causing the member 47 to rock from the position shown in Figure 6 into the position shown in Figure 2,—such parts passing through the intermediate position shown in Figure 7. When the parts have been rocked into the position shown in Figure 2, it will be seen that the projecting portion of the spindle 21 of the beater has been passed into the hollow shaft 11 and that the switch has been closed by the contact of the metal cylinder 49 (see Figure 4) with the stationary arms 48. The motor is thus started and rotary motion imparted to the beater or mixer.

When the mixing has been completed, the arms 43 are rocked into the position shown in Figures 3, 4 and 6 thus allowing the bottom plate 32 to move downwardly and disconnecting the upper projecting end of the mixer spindle with the shaft of the motor. However, it is to be particularly noted that the switch is opened (as shown in Figure 7) prior to the lowering of the plate 37, and consequently prior to the disconnecting of the upper end of the spindle from the motor shaft.

It has been found that the device stops operating practically simultaneously with the cutting off of the current to the motor, and consequently no undesirable spattering or wearing action occurs between the keyed portion 29 of the spindle of the mixer and the lugs 12 of the motor shaft, as the motor is stopped before the spindle can be disconnected from the motor shaft.

It is to be noted that when the parts are in the position shown in Figure 6 that the switch mechanism is held or locked in open position by the contacting of the bottom or supporting plate with the flat part of the projecting portion 47.

It is to be further noted that when the device is in operative position, as shown in Figure 1, that the spring pressure between the upper and lower plates which receive the container and cover is augmented by the pressure downwardly of the motor shaft against the cover thus aiding in effectively maintaining a tight joint for the cover.

It will thus be seen that a mixer has been provided in which no splashing can possibly occur in the operation of the device. It will further be seen that means have been provided whereby the motor is stopped prior to the removal of the container and that the stopping of the motor is automatically effected prior to the release of the container. It will further be seen that a mixing device has been provided which, although suited to other uses, is particularly adapted for mixing drinks and can be operated in a very rapid and easy manner.

Although the invention has been described in considerable detail, it is to understood that the invention may be variously embodied and is, therefore, to be limited only as claimed.

I claim:

1. A mixer comprising a container, a mixing element carried thereby and provided with a spindle, a cover for said container through which the upper end of said spindle projects, a frame for receiving said container and for applying spring pressure upon said cover, a motor carried by said frame and having a shaft adapted to lock with the upper end of said spindle, and means for raising said spindle into engagement with the motor shaft, and switch mechanism, operated by said means, for controlling said motor.

2. A mixer comprising a container, a mixing element carried thereby and provided with a spindle, a cover for said container through which the upper end of said spindle projects, a frame for receiving said container and for applying spring pressure upon said cover, a motor carried by said frame and having a shaft adapted to lock with the upper end of said spindle, and means under the control of an operator for elevating said container and moving the upper end of the spindle into engagement with the motor shaft, said means having a switch arm adapted to close the motor circuit.

3. A mixer comprising a frame, an electric motor carried by said frame and having a downwardly extending socketed shaft, a pair of plates arranged in spaced relation and movably carried by said frame, a container having a mixing element provided with a vertical spindle, a top for temporarily closing the upper end of said container and permitting the upper end of the spindle to project therefrom, a transverse shaft mounted below the lowermost of said plates and having a laterally projecting arm, and means for rocking said shaft for causing said arm to contact with the lowermost of said plates, and elevate the container to a position in which the projecting portion of said spindle is positioned within the socketed portion of said motor shaft.

4. A mixer comprising a frame, an electric motor carried by said frame and having a downwardly extending socketed shaft, a pair of plates arranged in spaced relation and movably carried by said frame, a container having a mixing element provided with a vertical spindle, a top for temporarily closing the upper end of said container and permitting the upper end of the spindle to project therefrom, a transverse shaft mounted below the lowermost of said plates and having a laterally projecting arm, means for rocking said shaft for causing said arm to contact with the lowermost of said plates and elevate the container to a position in which the projecting portion of said spindle is positioned within the socketed portion of said motor shaft, a switch arm carried by said transverse shaft, and a pair of stationary contacts controlling said motor and adapted to receive the switch arm between them when said transverse shaft is rocked into container elevating position.

In testimony that I claim the foregoing I have hereunto set my hand at Milwaukee, in the county of Milwaukee and State of Wisconsin.

HARRISON D. FLEGEL.